United States Patent
Tyer

(12) 
(10) Patent No.: US 6,349,658 B1
(45) Date of Patent: Feb. 26, 2002

(54) AUGER COMBUSTOR WITH FLUIDIZED BED

(75) Inventor: Robert C. Tyer, Orange Park, FL (US)

(73) Assignee: Environmental Improvement Systems, Inc., Jacksonville, FL (US)

( * ) Notice: Subject to any disclaimer, the term of this patent is extended or adjusted under 35 U.S.C. 154(b) by 0 days.

(21) Appl. No.: 09/552,097

(22) Filed: Apr. 19, 2000

Related U.S. Application Data

(60) Provisional application No. 60/162,430, filed on Oct. 28, 1999.

(51) Int. Cl.⁷ ............................. F23K 3/14; F23G 5/00
(52) U.S. Cl. ............................. 110/235; 110/101 CD; 110/110; 110/243; 110/244; 110/245
(58) Field of Search ............................. 110/243, 244, 110/245, 235, 101 R, 104 R, 101 CD, 101 CC; 122/4 D; 165/104.16; 422/273, 233

(56) References Cited

U.S. PATENT DOCUMENTS

| | | | |
|---|---|---|---|
| 1,214,753 A | * 2/1917 | Caracristi | 406/54 |
| 1,307,365 A | * 6/1919 | Kinyon | 110/104 R |
| 2,615,407 A | * 10/1952 | Ragusan | 110/104 |
| 4,210,491 A | * 7/1980 | Schulman | 201/2.5 |
| 4,244,305 A | * 1/1981 | Kawano et al. | 110/245 |
| 4,331,084 A | * 5/1982 | Fitch et al. | 110/186 |
| 4,385,566 A | * 5/1983 | Harris | 110/110 |
| 4,422,388 A | * 12/1983 | Raskin | 110/261 |
| 4,553,285 A | * 11/1985 | Sachs et al. | 110/223 |
| 4,589,355 A | * 5/1986 | Chastain et al. | 110/346 |
| 4,848,249 A | * 7/1989 | Le Pori et al. | 112/234 |
| 5,160,707 A | * 11/1992 | Kinyon | 422/170 |
| 5,246,364 A | * 9/1993 | Landreth et al. | 431/3 |
| 5,441,714 A | * 8/1995 | Oakes | 423/235 |
| 5,518,980 A | * 5/1996 | Lin | 502/400 |
| 5,693,293 A | * 12/1997 | Reichardt et al. | 422/168 |
| 5,746,144 A | * 5/1998 | Breen et al. | 110/345 |
| 5,795,548 A | * 9/1998 | Madden et al. | 422/171 |
| 5,826,518 A | * 10/1998 | Bhat et al. | 110/216 |
| 5,967,063 A | * 10/1999 | Wu | 110/240 |
| 5,976,203 A | * 11/1999 | Deeke et al. | 48/62 R |

\* cited by examiner

*Primary Examiner*—Denise L. Esquivel
*Assistant Examiner*—K. B. Rinehart
(74) *Attorney, Agent, or Firm*—Steven R. Scott

(57) ABSTRACT

An improved auger combustor for the incineration of refuse featuring, in its preferred embodiment, a granular substrate formed as a fluidized bed by underfire air and composed of particulate material with pollution abatement properties, an auger with expandable flights, a post combustor treatment zone comprised of particulate material with pollution abatement properties suspended in the gas stream exiting the auger combustor chamber; and in alternate embodiments, also including the ability to insert combustible fuel gases from the bottom of the combustor chamber, particularly at the input end of the combustor chamber, and/or the volumetric expansion of the combustor chamber from the input to the output end as a means of increasing retention time for gases released by the burning of refuse in the combustor chamber.

24 Claims, 7 Drawing Sheets

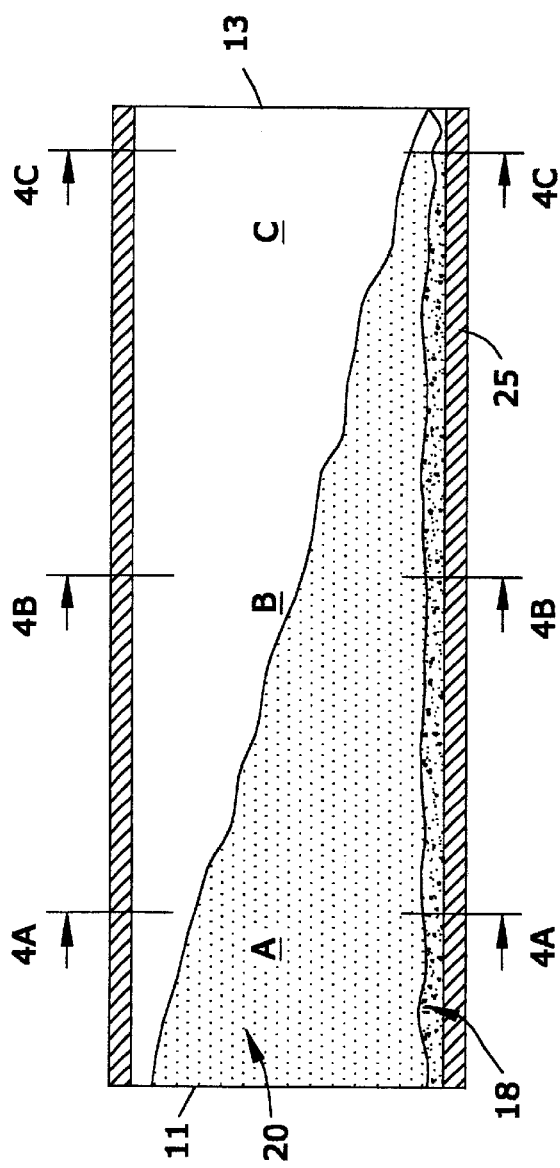
FIG.3
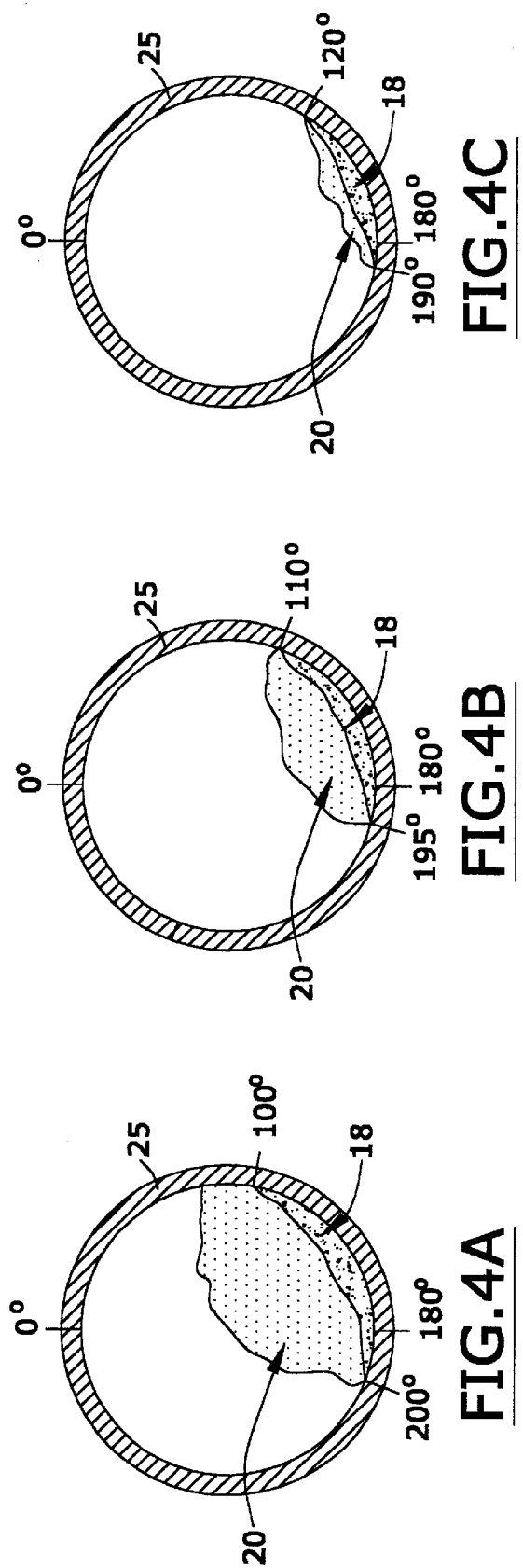
FIG.4A
FIG.4B
FIG.4C

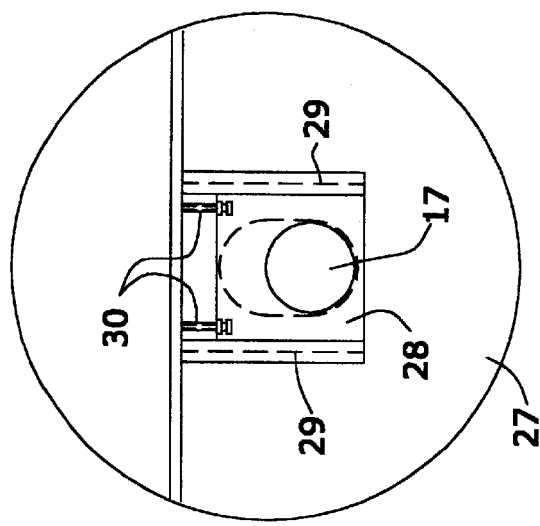
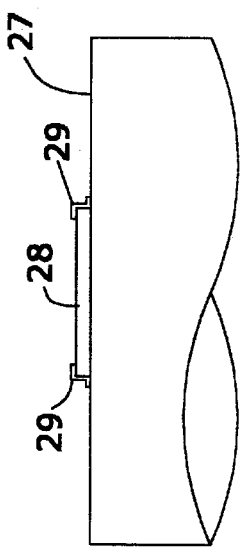
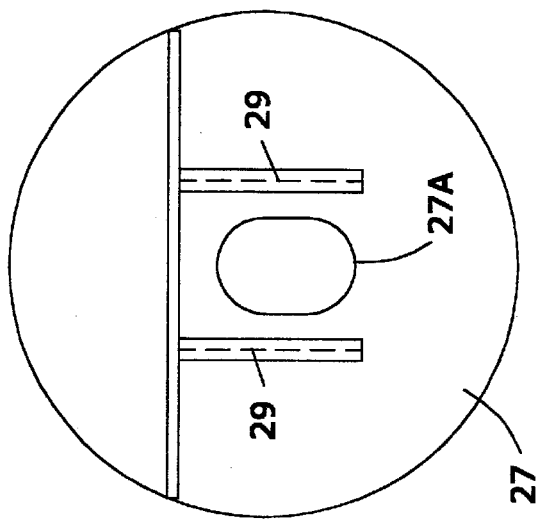
FIG. 7
FIG. 8
FIG. 6

AUGER COMBUSTOR WITH FLUIDIZED BED

This application claims benefit of provisional application Ser. No. 60/162,430 filed Oct. 28, 1999.

BACKGROUND OF THE INVENTION

1. Field of the Invention

This invention relates generally to incinerators, and more particularly to incinerators for the combustion of heterogenous waste materials such as household and commercial refuse. In the embodiments described, it teaches the provision of a removable noncombustible granular substrate beneath the material being consumed in the primary combustion chamber/gasifier of a rotating auger incinerator to aid in the more complete diffusion of combustion air through the materials being burned, to facilitate treatment of undesirable emissions from the materials being burned, and most importantly, to act as an "air bearing" for the material being consumed and to thereby facilitate its movement through said chamber. It also teaches the provision of an auger with expandable flights in such an incinerator, the suspension of treatment particles in the gas stream leaving said combustor/gasifier, and numerous other improvements.

2. Prior Art in the Field a) General Background Information

Much of the world's energy needs have been, and continue to be, filled by hydrocarbon fuels. In the past, such fuels provided a convenient, plentiful, and inexpensive energy source. The current rising costs of such fuels and concerns over the adequacy of their supply in the future has made them a less desirable energy source and has led to an intense investigation of alternative sources of energy. The ideal alternative energy source is a fuel which is renewable, inexpensive, and plentiful, with examples of such fuels being the byproducts of wood, pulp, and paper mills, and household and commercial refuse.

The use of such alternative energy sources is not problem-free, however, since there is reason for concern over the contents of the emissions from the combustion of such fuels as well as the environmental ramifications of acquiring and transporting the fuel and disposing of the residue of combustion. Starved-air combustors, wherein the air supplied for combustion is controlled in order to control temperature conditions (and the rates of combustion) so as to consume the fuel entirely, have proved very useful in the utilization of such alternative energy sources while simultaneously maintaining a high degree of environmental quality in emissions. Such starved-air combustors are capable of burning various types of fuel and producing significant amounts of heat which can be employed for any number of purposes including the production of process steam for use in manufacturing and in the generation of electricity.

Unfortunately, most starved-air combustors, as originally developed and operated, were not entirely satisfactory in consuming the combustible elements of the fuel at high throughput while not producing noxious emissions. This problem resulted, in part, from the use of such combustors to burn a wide variety of fuels, including many which were nonhomogeneous, such as household or commercial refuse. While the pollution problem can be solved to a degree by the utilization of scrubbers and other antipollution devices, such mechanisms are very expensive and their cost may militate against the use of alternative energy sources previously described.

b) The Auger Combustor/Gasifier

Many of the drawbacks of such prior art devices were overcome by the development of the auger combustor/gasifier by the inventor and others. See, U.S. Pat. No. 4,009,667 (describing the original auger combustor/gasifier utilized in the system); U.S. Pat. No. 4,315,468 (describing an incinerator control means for the system); U.S. Pat. No. 4,331,084 (describing a refuse fuel feed mechanism for the system); U.S. Pat. No. 4,331,085 (describing a flame stabilization means for the system); U.S. Pat. No. 4,332,206 (describing an afterburner for the system); and U.S. Pat. No. 4,332,206 (describing a hot gas recycle mechanism for use with the system). The auger combustion technology taught and described in the foregoing patents offers a cost-effective approach to clean, efficient combustion of prepared solid waste and other solid fuels. It employs a starved-air combustion technique, partially combusting or gasifying solid fuel in a primary chamber (the "combustor/gasifier"), then passing the combustible gases to an afterburner where sufficient air is added to complete combustion.

One of the unique features of the auger combustor/gasifier system is the variable-pitch auger. The fuel enters the combustor/gasifier at a controlled rate and is shaped into a pile by the first auger flight. It is then pushed and tumbled through the combustor/gasifier chamber by the auger. As the auger moves the fuel through this horizontal cylinder, it stirs the material to maximize exposure to the oxidizing air injected into the chamber. The pitch of the auger decreases along the path of material flow to accommodate the decrease of fuel bulk as the material combusts. This ability to manage fuel-bed configuration permits control of forced-draft combustion air to gasify nearly all the fuel without complete combustion taking place, thereby allowing the combustor/gasifier to operate at what is, for an incinerator, a uniformly moderate temperature (e.g. 1,500–1800F).

c) The Use of Granular Substrates

The combination of fuel bed stirring and air injection with precise temperature control gives the auger combustor/gasifier system several advantages over prior technology: Reliability and clean operation; high throughput; low gasifier temperature, afterburner combustion of only gaseous fuels, precise flame structure and temperature control; longer material life (refractory and auger); fully automatic control; and the ability to combust a wide variety of heterogenous solid fuels. However, it has been discovered that several of these advantages may be further strengthened by the addition of a substrate of appropriate granular materials to act as an "air bearing" in the auger combustor/gasifier chamber, to aid in the diffusion of combustion air through the material being burned, and to facilitate treatment of harmful emissions from the materials being burned. Moreover, the advantages inherent in the use of such a substrate are even further magnified by its use in conjunction with a combustor/gasifier chamber wherein the pressure of the air forced through the substrate is at its maximum at the fuel input end of the chamber and at its minimum at the output end of the chamber.

Granular fuels being burned in incinerators have been, in the past, formed into fluidized beds via the insertion from underneath of combustion air at appropriate pressures. In such incinerators, the granular fuel forming the fluidized bed is moved by the fluidization means or by a movable grate under the bed. The fluidization of the granular fuel aids in its combustion and its movement through the combustion chamber. However, the inventor is aware of no incinerators in which a fluidized bed acts as a substrate for the material being burned and is formed from a noncombustible material which remains generally stationary with respect to such material, acts as an "air bearing" for such material, aids in the diffusion of combustion air into and through such material, and may be utilized to help treat and eliminate undesirable emissions from the material being burned.

In addition to those patents enumerated above with regard to the auger combustor/gasifier, representative patents illustrating the current state of the art in the area of starved air incinerators include the following:

1. "Apparatus for the Combustion of Poorly Combustible Fuels" issued to Cosar (U.S. Pat. No. 4,809,620) in 1989.
2. "Method and Apparatus for Regulating the Furnace Output of Incineration Plants" issued to Martin (U.S. Pat. No. 4,953,477 in 1990.
3. "Method and Apparatus for the Efficient Combustion of a Mass Fuel" issued to Barlow (U.S. Pat. No. 5,044,288) in 1991.
4. "Incinerating-Fusing System for City Refuse Disposal" issued to Tsunemi et al. (U.S. Pat. No. 5,078,065 in 1992.
5. "Process and Apparatus for Emissions Reduction from Waste Incineration" issued to Khinkis et al. (U.S. Pat. No. 5,205,227 in 1993.

Upon review of these patents it will be found that none anticipate or render obvious the unique innovations described herein.

d) The Use of Expanding Auger Flights

The efficient and trouble-free operation of the system as a whole depends in part on the reliability of its most distinctive feature-the auger (with its water cooled hollow shaft) which is utilized to convey fuel through the combustor/gasifier. In this regard, it has been discovered that (in operation) the auger is more readily subject to failure if provision is not made for the expansion of the material making up its flights when subjected to elevated temperatures within the combustor/gasifier chamber.

Numerous means have been utilized in the attempt to create auger conveyors that can operate without problems at high (and possibly varying) temperatures without failure. Representative patents in this area include the following:

1. "Expansion Coupling for Screw Conveyors" issued to Parker (U.S. Pat. No. 1,829,453) in 1931.
2. "Floating Auger Flight for Conveyors" issued to Mayrath (U.S. Pat. No. 3,219,178) in 1965.
3. "Screw Conveyor Apparatus" issued to Christian (U.S. Pat. No. 3,637,069) in 1972.
4. "Temperature Expansive Screw Conveyor" issued to Millsap (U.S. Pat. No. 4,399,906) in 1983.

However, none of these means is suitable for use with the unique auger conveyor utilized in the auger combustor/gasifier system previously described.

U.S. Pat. No. 1,829,453 issued to J. N. Parker in 1931 is appropriately titled "Expansion Coupling for Screw Conveyors," and teaches the design for an auger featuring such a coupling in its shaft. However, shaft expansion is not a problem in the instant system as the shaft is water cooled. The problem is, instead, finding a means of maintaining the distinctive configuration of the auger flights utilized in the instant system when the system is in operation (and therefore subject to the elevated temperatures within the combustor/gasifier) despite the expansion of the material making up the auger flights.

U.S. Pat. Nos. 3,219,178 and 3,637,069 issued to Mayrath and Christian, respectively, likewise fail to solve this problem. Both teach systems wherein the flights of the auger are, in general, slidable with respect to the shaft. Thus, the flights are enabled to expand and lengthen when exposed to elevated temperatures, but only by sacrificing the integrity of the auger's initial configuration. This is totally unacceptable in the context of the instant system as the configuration of the auger conveyor utilized, with its tapering flights, is an integral part of the system's design and must be maintained in order to guarantee the proper functioning of the system.

U.S. Pat. No. 4,399,906 issued to Millsap teaches the design for an expandable auger wherein the auger flights are attached to stakes that extend completely through the shaft and are slidable with respect thereto. Thus, as the material making up the auger flights expands, the flights are enabled to expand away from the shaft, increasing the overall diameter of the auger. This is also unsuitable in the current application. The auger flights of the auger utilized in the current application must be maintained at precise distances from the floor and sides of the combustor/gasifier. These relationships would be distorted if the diameter of the auger was allowed to expand. Further, it would be unsuitable in the current application because of the openings in the shaft that allow the penetration of the stakes therethrough. This would, in the instant application, interfere with or render impossible the water cooling of the shaft. Thus, there are no solutions provided in current or preexisting art for the flight expansion problem required to be solved for the optimum functioning of the auger utilized in the auger combustor at elevated temperatures.

e) Direct Suspension of Cleaning Materials in Gas Stream

The inventor is aware of no prior art similar to that taught herein in the field of waste incineration. However, the techniques for the suspension of particulates in a vertical gas stream are well known in the gypsum industry where vertical driers are used in the manufacturing of gypsum board.

f) Additional Bottom Firing at Fuel Input End

The use of addition fuel sources to assist in the firing and combustion of less combustible materials, such as the input of an inflammable gas stream (e.g.-propane), is well known in the field of waste incineration. The inventor is, however, not aware of any prior use of such techniques in a device of the type described herein.

g) Volume Expansion of Auger Combustor Interior at Output End

It is desirable in waste incineration to increase the residency time in the incinerator of various gases released by the incineration process. The volumetric increase of a gas channel as a means of slowing the flow of gas therethrough is well understood in the arts pertaining to fluid dynamics. The inventor is, however, not aware of any prior use of such techniques in a device of the type described herein.

SUMMARY AND OBJECTS OF THE INVENTION

The auger combustor/gasifier constructed in accordance with the teachings of this invention features, as is typical for incinerators of this type, an auger that is (a) disposed in a horizontal position within the combustor/gasifier chamber in close proximity to the bottom of the chamber such that it is proximate the (b) the refractory material that covers the interior of the chamber.

1. Fluidized Bed and Segmentation of Combustion Chamber

In its most basic embodiment, the instant invention would add a layer of noncombustible granular material to the bottom of the combustor/gasifier chamber (between the auger and the bottom of the chamber), which noncombustible granular material is suspended and maintained in a substantially fluidized state by the influx/insertion of air at high pressures from below and serves as a supporting substrate for the materials being incinerated in the chamber.

The addition of this layer of noncombustible granular material in the form of a fluidized fuel supporting substrate has, as previously noted, several important benefits. First, it acts to provide the equivalent of an "air bearing" as the granular materials utilized for the substrate are substantially suspended or floating in the high pressure air inserted from underneath. It has been found that this substantially lowers the amount of effort/energy required (via the auger) to convey material being burned through the chamber. Second, it acts to further diffuse the air being fed from underneath the fuel burned, assisting the process of complete incineration. Third, it provides a buffer or pad between the heterogenous and often abrasive materials being incinerated and the refractory, protecting the refractory from abrasion or other damage and prolonging its useful life. Fourth, by utilizing limestone or other appropriate treatment materials for the granular substrate, this system provides a means of treating gaseous emissions from the materials incinerated, avoiding or reducing the need for other treatment means which absorb useful heat and thereby reduce profitability.

In its more advanced and preferred embodiment, as illustrated herein, the auger combustor/gasifier constructed in accordance with the teachings of this invention also features two other improvements and innovations. First, the granular material forming the substrate is readily renewable, being readily placed and removed. Second, the pressure of air injected from underneath the granular material decreases between the fuel input end of the combustor/gasifier chamber and the output end thereof.

Renewability of the granular material utilized for the substrate is accomplished by inclusion of means for the ready insertion of said granular material and construction of the incinerator in such manner that the auger, which is typically suspended and held in position at opposite ends of the chamber, may be readily raised away from the floor of the gasifier chamber or lowered to a position adjacent thereto. The ability to raise and lower the auger allows the placement of the substrate of granular material utilized by this invention on the floor of the chamber (when the auger is elevated) and its ready removal from the chamber (when the auger is lowered so that its flights sweep the material from the chamber). A supplemental auger or other means is utilized to inject limestone or other substrate material into the auger combustor chamber.

While the desirability of providing means for the ready renewability of bed material requires no explanation and is readily understood, the objects accomplished by the injection of the air utilized to hold the granular material in suspension at diminishing pressures along the length of the chamber require reference to the auger combustor/gasifier incineration process. In this process, fuel introduced into the auger combustor/gasifier chamber is consumed/gasified as it is moved through the chamber by the auger, resulting in an ever smaller volume and weight of fuel material as it is moved from the point where it is introduced into the chamber. If air is inserted at a constant pressure from underneath the substrate for the entire length of the chamber, the pressure may be either undesirably low at the end of the chamber where fuel is injected (the "input end") and the fuel being consumed is heaviest, or undesirably high in the opposite end of the chamber (the "output end") where most of the fuel has been gasified and the remainder to be consumed is lightest. Thus, supplying air to the chamber at a constant pressure may be either: (a) insufficient to supply necessary oxygen and to create the desired "air bearing" effect at the input end of the chamber; or (b) it may be (if pressure is high enough to accomplish these goals at the input end of the chamber) too high in the output end of the chamber, resulting in the lifting of substrate, ash, debris and unburned fuel/refuse from the floor of the chamber and its possible dispersion into other parts of the system with potential disruptive effects. The inventor's solution to this problem is the subdivision of the auger combustor chamber into segments with each successive segment having its own plenum supplying air at successively diminishing pressures.

2. Auger with Expanding Flights

As previously noted, the auger gasifier/combustor is distinguished by an auger with a water cooled shaft and flights that are spaced from the shaft and held in position relative to the shaft by "standoffs" which extend outwardly from the shaft like spokes, but do not penetrate the shaft. Due to the extreme heat in the incinerator environment, the material that makes up the flights of the auger expands when the incinerator is in use. If means are not provided to absorb and/or counteract the expansion in each segment of the auger flights, the shape of the auger may become distorted, stress will be placed on the uprights holding the auger flights, and the system may fail or fail to perform in an optimum manner.

The inventor has solved these problems by dividing the flights of the auger into separate sections with each section being provided with leeway to expand only in a manner that does not distort the overall configuration of the auger. In general, each section of the auger flight is fixed to four uprights; however, these numbers may vary. Each such section is slidably attached to all but one of these uprights. Further, where sections meet, they slidably overlap. These design innovations allow the lengthwise expansion of each flight only along the spiral path dictated by the placement of the standoffs without distortion of the configuration of the auger.

3. Direct Suspension of Cleaning Materials in Gas Stream

The direct suspension of cleaning material in the gas stream leading from the incinerator to the afterburner serves to greatly enhance the cleaning of the gas stream and the removal/treatment of possible pollutants.

4. Addition of Bottom Firing at Fuel Input End

The addition of fuel sources and firing mechanisms at the input end of the auger combustor incinerator serves to greatly increase throughput when needed to maintain the pace of treating incoming waste materials and is greatly facilitated by the use of the granular fluidized bed mechanisms described herein.

5. Volume Expansion of Auger Combustor Interior

The volumetric expansion of the auger combustor chamber from input to output end is extremely useful in slowing the flow of gas therethrough, leading to increased residency time in the incinerator and a more complete break-down of various gases produced.

BRIEF DESCRIPTION OF THE DRAWINGS

FIG. 3 is a schematic side view of an auger combustor/gasifier chamber illustrating its division into three sections-Section A, Section B, and Section C.

FIG. 4A provides a cross-sectional view related to Section A.

FIG. 4B provides a cross-sectional view related to Section B.

FIG. 4C provides a cross-sectional view related to Section C.

FIG. 6 provides a front view of one end of the combustor chamber illustrating the elongated opening which allows adjustment of auger height.

FIG. 7 provides a front view of one of the sliding plates that fit over the elongated openings in the ends of the combustor chamber.

FIG. 8 provides a bottom view of one the sliding plates in place over the elongated opening in the end of the combustor chamber.

DETAILED DESCRIPTION OF THE PREFERRED EMBODIMENTS

1. Fluidized Bed and Segmented Combustor Chamber

Figure 1:
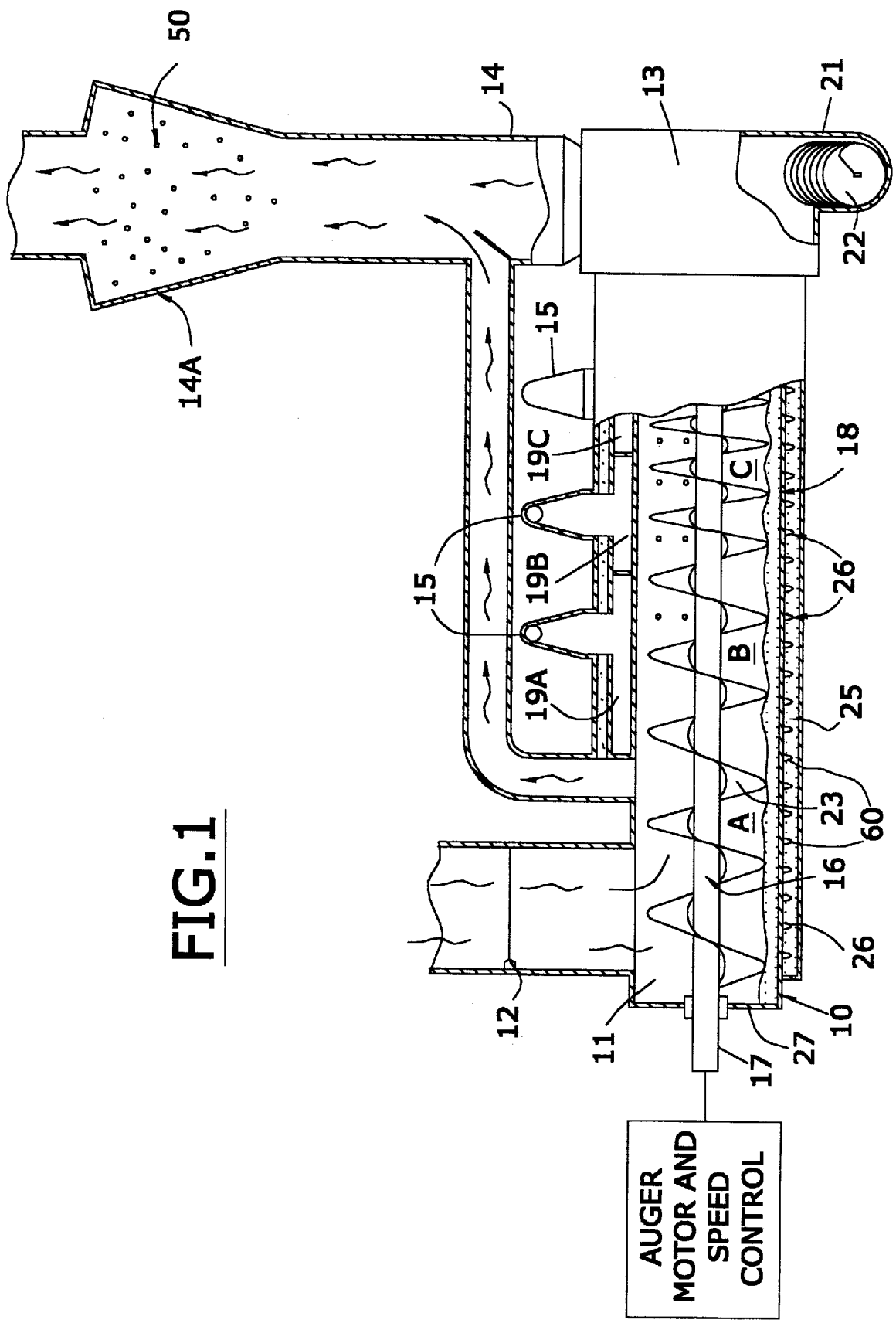
FIG. 1 provides a first side view of an auger combustor/gasifier chamber and associated systems.
Figure 2:
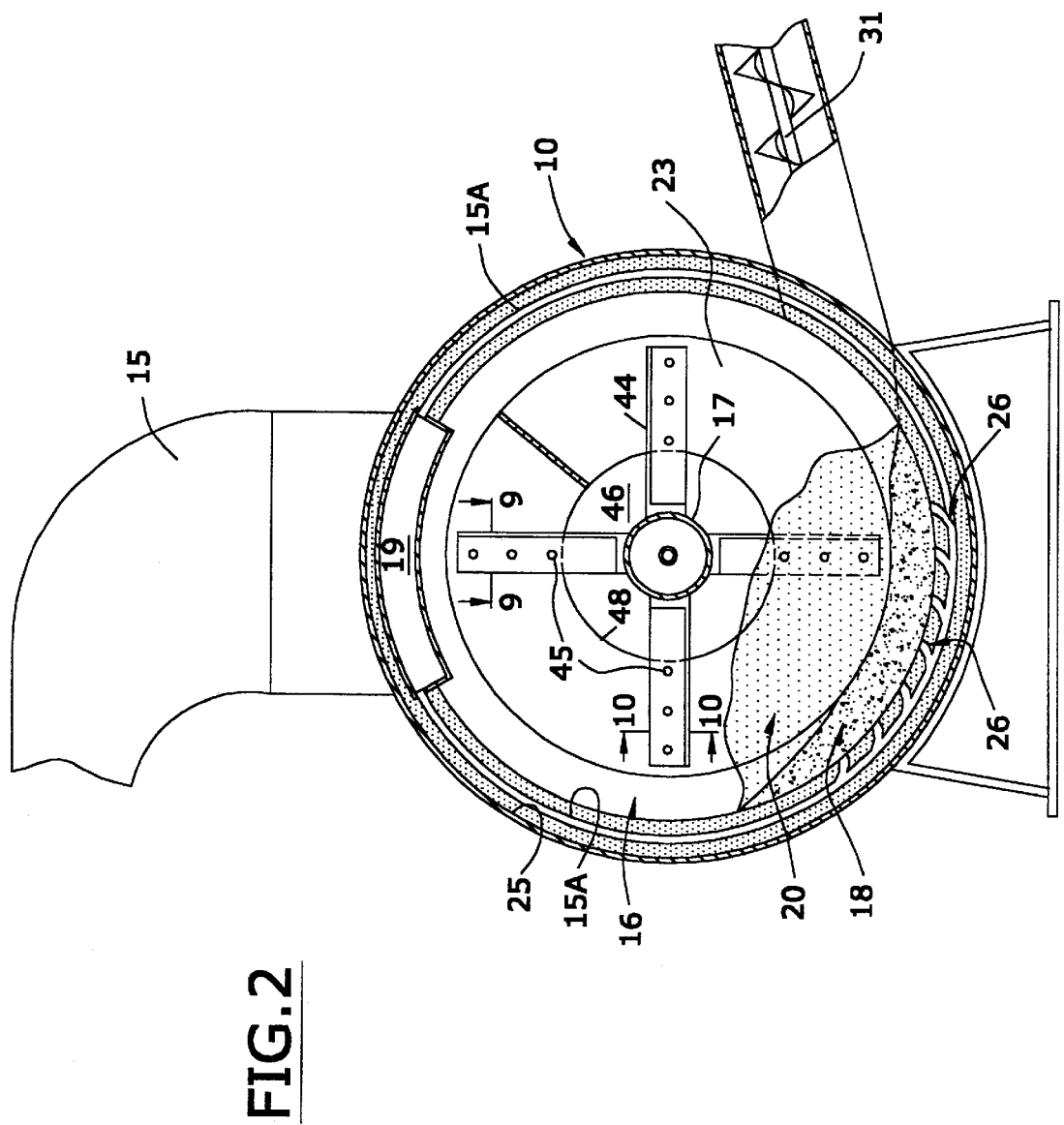
FIG. 2 is a first cross-sectional end view of an auger combustor/gasifier chamber incorporating the improvements taught herein.
Figure 5:
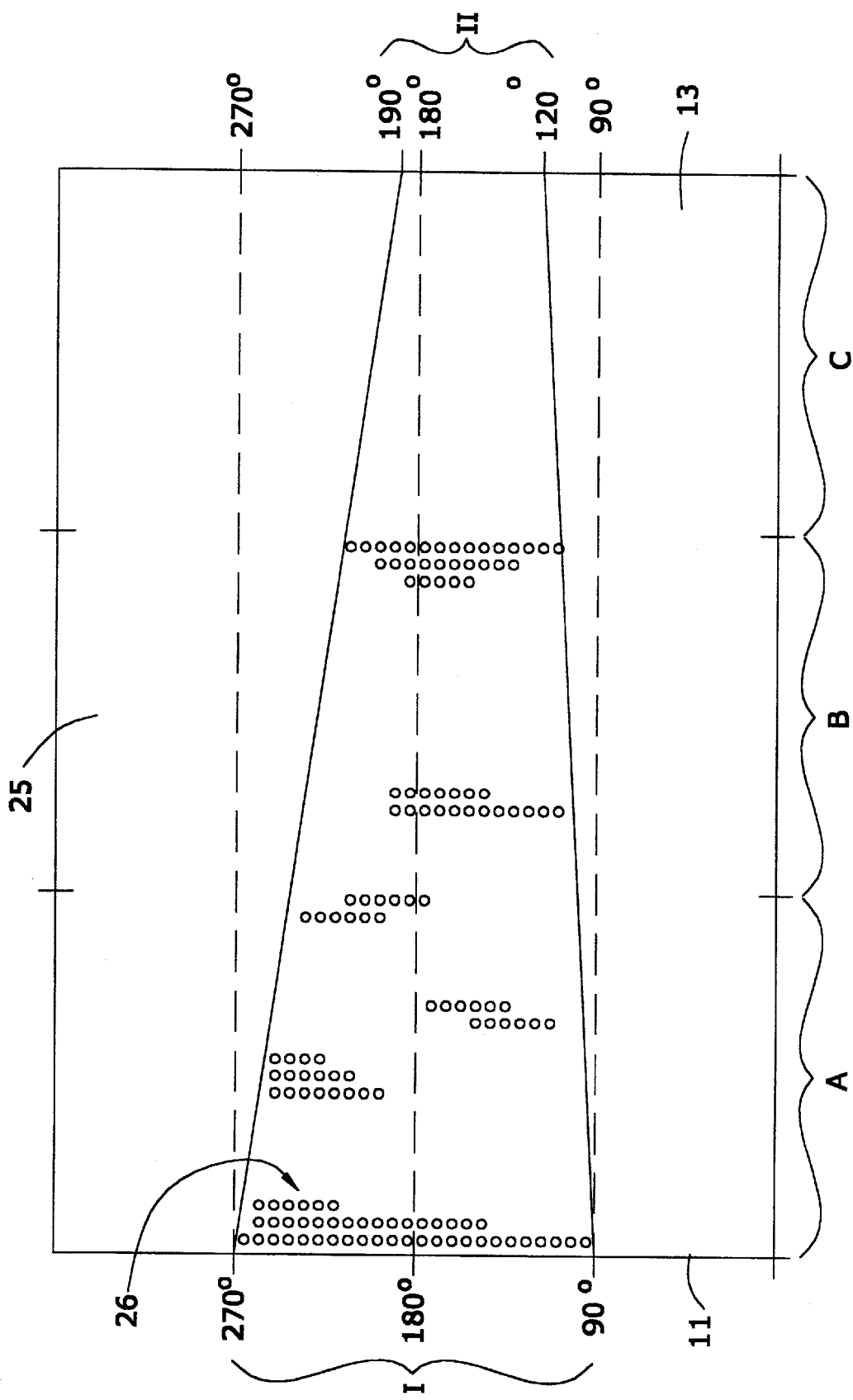
FIG. 5 provides an "opened" view of the refractory layer of the auger combustor/gasifier providing further information related to the distribution of forced-air outlets supporting the fluidized bed of the instant invention.
Figure 9:
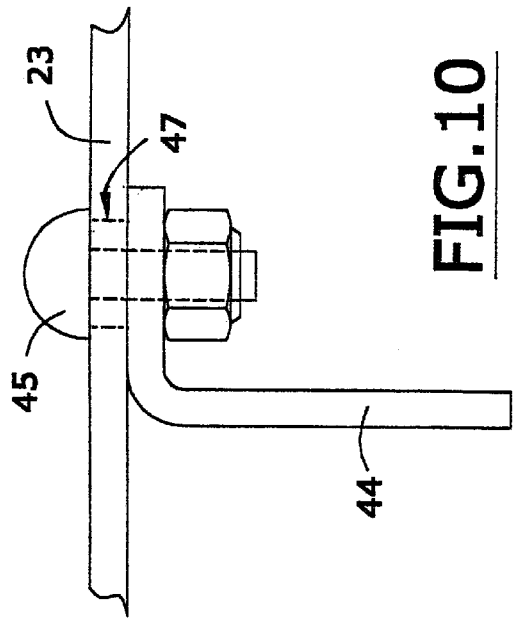
FIG. 9 is a cross-section of the auger flight at a first attachment location illustrating the means of connection that allows the expandable auger flights of the instant invention.
Figure 10:
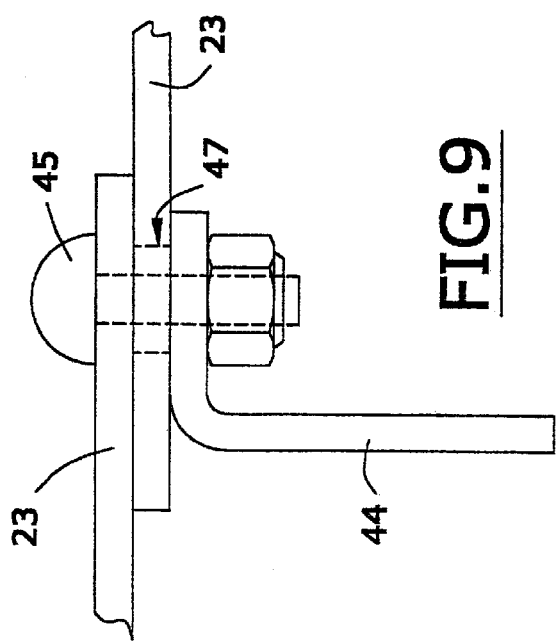
FIG. 10 is a cross-section of the auger flight at a second attachment location further illustrating the means of connection that allows the expandable auger flights of the instant invention.

Turning first to FIGS. 1 and 2, it will be seen that the combustor/gasifier chamber (hereinafter referred to as the "combustion chamber" and denoted generally by arrow 10) of a rotary auger incinerator produced in accordance with the teachings of this invention may be generally described as a hollow, horizontally disposed stationary cylinder. It has an inlet end 11 accessed by a shaft 12 through which combustible refuse is fed from a feed hopper (not shown). It likewise has an output end 13 connected to an exhaust conduit 14 which feeds the top of an afterburner (not shown). The combustion chamber 10 also includes air supply means 15 for supplying underfire air for combustion purposes. This air may be provided by the same blower (not shown) which supplies air to the afterburner. Alternatively, a separate blower or blowers may be provided to supply underfire air and air to the afterburner.

Extending the length of the combustion chamber is a rotatable auger (denoted generally by arrow 16) having a tubular axis 17 supported at the inlet end 11 by a bearing mounted to the front wall and at the outlet end by another bearing mounted to the rear wall, and driven by a hydraulic motor. The spiral flights 23 of the auger 16 extend from the front wall to the outlet end 13, so that when the auger 16 is rotated, the auger flights 23 will convey combustible refuse entering inlet end 11 from the feed hopper through the combustion chamber 10, and deliver the solid residue to the ash receptacle 21 at outlet end 13 where it can be removed via removal auger 22. The pitch of the auger flight 23 is greatest at the inlet end 11, and becomes gradually less toward the outlet end 13, to compensate for the reduction in volume of the refuse which takes place during combustion. The tubular axis 17 was, in prior embodiments, positioned off-center of the axis of the combustion chamber 10 so that there was minimum clearance between the outer edge of the auger flights and the bottom of the combustion chamber 10, to assure movement of essentially all of the refuse through the combustion chamber 10. In the embodiments illustrated, the tubular axis 17 can be raised (as shown) to allow the positioning and maintenance of a granular substrate (denoted generally by arrow 18) along the bottom of combustion chamber 10. Conversely, it can be lowered to the position typical of prior combustion chambers to sweep the granular substrate (or some portion thereof) from the bottom of combustion chamber 10.

The fuel bed (denoted generally by arrow 20) is at its greatest depth at the inlet end 11 of the combustion chamber and is conveyed from the inlet end 11 to the outlet end 13. During its travel through the combustion chamber, the fuel bed 20 gradually decreases in size as its contents are combusted and combustion gases evolved. As is typical of prior embodiments, conduits 23 supply underfire air to the combustion chamber beneath the bed of fuel 20 such that the underfire air, when at an elevated temperature, contributes to the ignition of the fuel in fuel bed 20 by heating and drying the fuel.

The walls of the combustion chamber include underfire air plenums 19A, 19B, and 19C, each of which is coupled to one of the air supply conduits 15. Air passes from the plenums 19A, 19B, and 19C through the underfire air conduits 15A embedded in refractory layer 25 to a plurality of ports or injectors (denoted generally by arrows 26) communicating with the combustion chamber from beneath granular substrate 18 and fuel 20. The plenums 19A, 19B, and 19C are separated from each other by stops or gaskets to define multiple underfire combustion zones/sections A, B, and C. Additional details related to the construction of sections A, B, and C, and the distribution of injectors 26 can be derived from review of FIGS. 3, 4A, 4B, 4C, and 5. As will be noted, the rotation of the auger 16 within the combustion chamber 10 results in the fuel bed 20 being swept somewhat to the side and oriented as shown in FIGS. 4A, 4B and 4C. These three sections may optimally be constructed with approximate equal lengths and with approximately the same number of injectors 26 per square inch. (In the embodiment illustrated the injectors are set in a grid pattern approximately 1.5 to 2 inches apart). The total number of injectors in combustion chamber 10 would, therefore, be approximately 1,200 in the embodiment illustrated. (only a small number of injectors are illustrated in the drawing figures to avoid overcrowding of same).

As illustrated in FIGS. 4A, 4B, 4C and 5 the off-center distribution of fuel bed 20 in combustion chamber 10 makes a similarly off-center distribution of injectors 26 advantageous for the purpose of supporting the granular substrate 18 and fuel bed 20. Injectors 26 are disposed across an initial arc (indicated by bracket I in FIG. 5) of approximately 180 degrees. The width of the area containing injectors 26 narrows as it moves from its start in Section A to its terminus in Section C. Injectors are disposed across a final arc (indicated by bracket II in FIG. 5) of only approximately 50 degrees. Likewise, just as the decreasing area of the fuel bed 20 makes it advantageous to decrease the area containing injectors 26 in moving from the inlet end 11 to the outlet end 13, the decreasing weight of fuel bed 20 makes it advantageous to decrease the pressure of the air supplied through injectors 26 as the fuel bed 20 is moved from inlet end 11 to outlet end 13. In the embodiment illustrated, it has been found that a pressure of 10" (H2O or water column) in Section A, a pressure of 4" in Section B, and a pressure of 2" in Section C, is optimal for most purposes. However, these settings may be adjusted upward for heavier waste materials and downward for lighter fuel materials. Likewise, when dealing with materials that are saturated with volatiles that will evaporate fairly easily, it may be necessary to make adjustments upward in Section A while making very little adjustment in Section C. Obviously, the system illustrated, which provides leeway for the independent adjustment of pressure in a plurality of sections, makes a variety of patterns possible in order to achieve optimal results.

FIGS. 6, 7, and 8, illustrate the means for raising and lowering auger 16 utilized in the preferred embodiment. In prior art embodiments of the auger/combustor, the tubular axis 17 of auger 16 penetrates the end walls of the auger/combustor and is mounted thereon using bushings in a manner well known in the mechanical arts. In the preferred embodiment illustrated, the sections of the end walls 27 penetrated by tubular axis 17 are replaced by plates 28 which are held adjacent to the end walls 27 by brackets 29. Plates 28 may be raised and lowered via set screws 30. The tubular axis 17 is approximately 12 inches in diameter. In the preferred embodiment the aperture 27A in each end wall 27 is approximately 12 inches in diameter (to match tubular axis 17), but is 18 inches in height. This allows the flights 23 of auger 16 to sweep all materials from the combustor chamber 10 when the tubular axis 17 is placed at its lowest setting while providing up to six inches of clearance for the placement of the fluidized bed characteristic of this invention. The granular substrate 18 may be placed or refurbished via substrate placement auger 31.

2. Auger with Expanding Flights

As previously noted, rotatable auger 16 has a tubular axis 17 and is supported at the inlet end 11 by a bearing mounted to the front wall and at the outlet end 13 by another bearing mounted to the rear wall. It extends the length of the combustion chamber 10. The pitch of the auger flights 23 is greatest at the inlet section A, and becomes gradually less through the middle section B, further decreasing in the outlet section C, to compensate for the reduction in volume of the refuse which takes place during combustion.

The auger flights 23 are comprised of individual segments which are joined together and concentrically spaced from the tubular auger shaft 17 by a plurality of support members 44, so that an open annular space 46 is formed between the inner edge 48 of the auger flights 23 and the auger shaft 17. This open space 46 allows air to freely move upward through the combustion chamber 10 as well as along the auger shaft 28 to the outlet section C. Different materials having different heat resistant characteristics can be used in forming these sections of the auger flights 23. For example, in the inlet portion, where there is little heat, carbon steel could be used, while stainless steel or a refractory alloy could be used in the rest of the combustion chamber 10.

Figure 11:
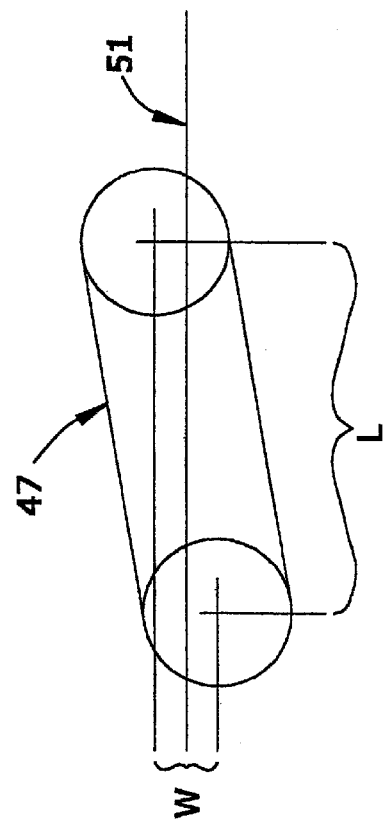
FIG. 11 provides a more detailed view of a slot of the type illustrated in cross-section in FIGS. 9 and 10.

Rivets 45 penetrate each upright 44. Auger flights 23 of 360 degrees are each fixed to four successive uprights 44 via rivets 45, but only rigidly attached to one (the first or leading upright). Slots (denoted by arrow 47) enable each flight 23 to be slidably attached to the remaining uprights 44. Each section of flight 23 is anchored at its leading edge, but secured by slots 47 to three remaining uprights. The slots 47 for each section of flight 23 become longer at each successive upright 44 following the upright 44 to which that section of the flight 23 is anchored to allow for the continuing expansion/lengthening of the section of flight 23 throughout its length. FIG. 11, in which line 51 would be perpendicular to an upright 44 illustrates the slight outward canting of slots 47 to allow for some slight outward expansion of the flights 23 when heated.

The materials used to make up flights 23 may vary. However, if the material chosen typically expands by X % per foot at the operating temperatures of t he combustor, it will be necessary to lengthen the next slot 47 after the leading upright 44 by an amount "L" equal to the circumferential distance between this slot 47 and the rivet 45 in the leading upright 44 times X %. The next slot 47 will have a length equal to twice this amount. The third slot will have a length equal to three times this amount. The distance allowed for outward expansion "W" will, however, remain constant for all of the slots, being equal to X % times the distance between rivet 45 and annular space 46.

3. Direct Suspension of Cleaning Materials in Gas Stream

This innovation allows the treatment of the gas stream leaving an incinerator/gasifier by cleaning material particles (denoted generally by arrow 50), which may advantageously be comprised of limestone or other cleaning materials, suspended in the segment between the incinerator/gasifier and the afterburner. It is accomplished by the flaring or volume expansion of one part of a portion of exhaust conduit 14. The expanded segment (denoted generally as 14A) results in a slowing of the movement of gas through this segment (allowing time for intermixing and treatment with suspended particles). This expansion produces a rate of movement in the gas stream that is sufficient to counterbalance the pull of gravity on the cleaning material particles 50 injected into the segment while at the same time not being sufficient to simply push them into the afterburner. This results in the suspension of the treatment material particles 50 in the gas flow from the incinerator/gasifier and creates an optimum treatment environment. As treatment materials 50 build up they will eventually reduce the available volume in the expanded segment 14A, increasing the velocity and/or pressure of the gas stream. This will result in the sweeping of part of the treatment materials 50 into the afterburner. The particles in the expanded segment 50 can, in this manner be periodically refurbished using a supplemental injector such as an auger (not shown). This auger may advantageously be mounted at expanded segment 14A, but may also be mounted below same where exhaust gases from the combustor chamber 10 will sweep particles 50 up into the expanded segment 14A.

4. Addition of Bottom Firing at Fuel Input End

The use of additional fuel sources (e.g.-propane) at the input end 11 of the combustion chamber 10 can be easily accomplished utilizing separate dedicated uderfire fuel injectors 60 for this purpose. As the fuel bed 20 is tumbled by augur 16 the material making up same is continually rolled under. Thus, by way of example, the material adjacent to the 200 degree mark in FIG. 4A will be rolled under toward the 180 degree mark in FIG. 4A. This process continues through the sequence illustrated in FIGS. 4B and 4C. The injection of firing fuel sources at or adjacent to this leading edge (i.e.—along the line running in FIG. 5 from 270 degrees at I to 190 degrees at II) allows the fired bed materials to be rolled under to where they have direct access to underfire air from injectors 26. From this position the flames from these fired bed materials also can infiltrate and help to initiate the burning of other bed materials located above injectors 26.

A further alternative is to add such uderfire fuel injectors 60 among injectors 26 under fuel bed 20. In this case, the injection of combustible materials through and via a granular bed acts to further disperse the fuel and improve the burning of the fuel bed 20 thereby. In this regard, it may be compared to the use of a granular bed in the typical propane fueled backyard cooker between flame and foodstuffs as a means of dispersing heat and improving performance. The injection of combustible materials via the fluidized bed 18 provides even further improvements in the dispersion and efficiency with which the underfiring takes place.

5. Volume Expansion of Auger Combustor Interior

Figure 12:
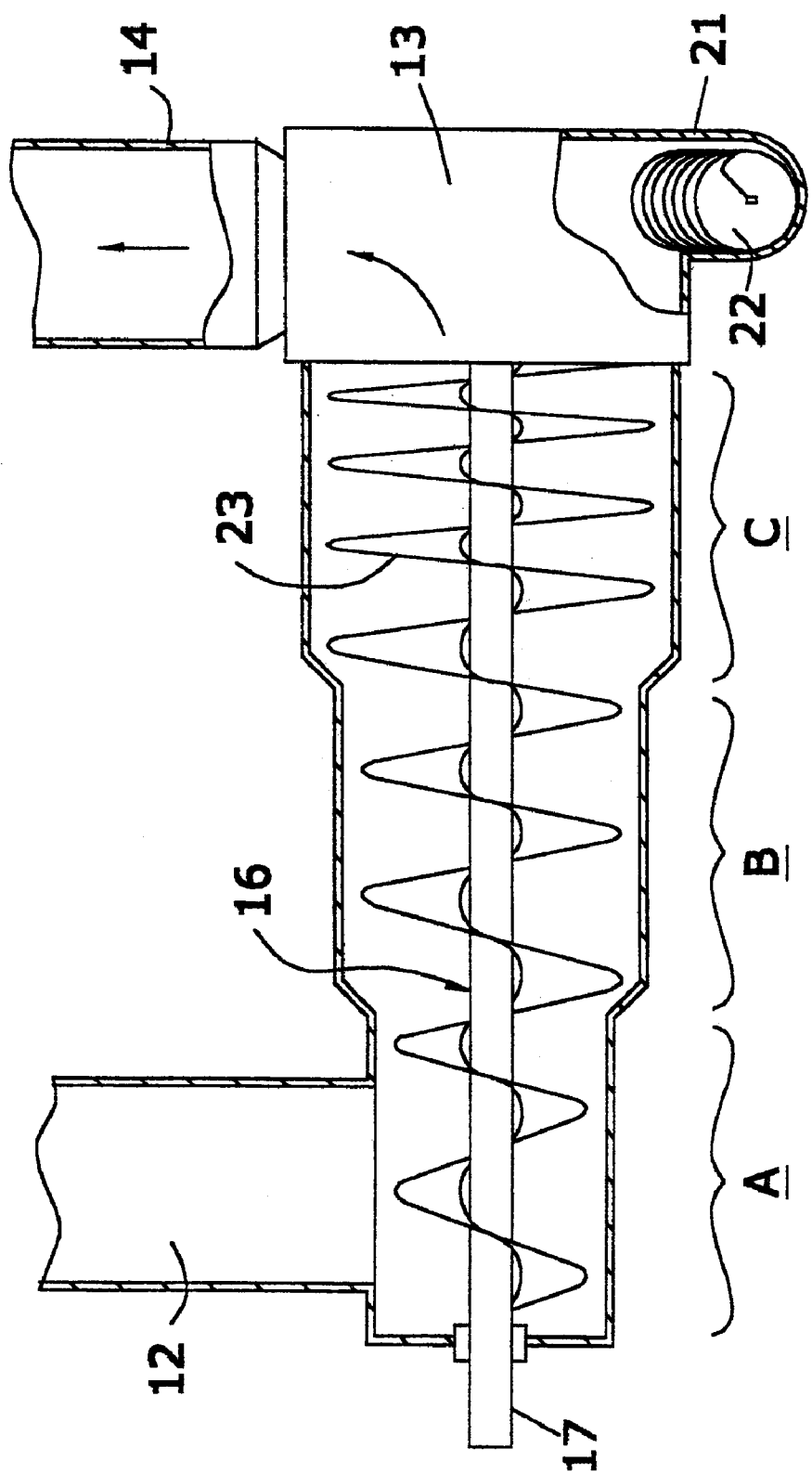
FIG. 12 provides a schematic view from the side of an auger combustor with volumetric expansion.

FIG. 12 provides a schematic view of an auger combustor chamber (indicated generally by arrow 100) that expands as it moves from Section A at the input end 11, through Section B intermediate the inlet end 11 and the outlet end 13, to Section C at the output end 13. As is evident from review of FIG. 12, this expansion requires a similar adjustment of the auger 16.

CONCLUSION

Further information and details may be derived from the claims for examination that follow and from the somewhat more comprehensive listing of possible claims set forth in Exhibit A, attached.

What is claimed is:

1. An incinerator for burning combustible materials, comprising:
    an elongated horizontally disposed stationary combustion chamber means, said chamber means having a first end with an inlet for receiving combustible materials into its interior and a second end with an outlet for discharging exhaust gases and combustion residue therefrom, the horizontal position of said elongated stationary combustion chamber means defining an upper and a lower side thereof, with a plurality of openings in the lower side thereof;
    a screw conveyor means extending through said chamber means' interior from proximate said first end to proximate said second end for moving materials therethrough;
    a plurality of particles disposed in the interior of said chamber means above the plurality of openings in the lower side thereof;
    a plurality of air supply means;
    a plurality of distributing means disposed intermediate said plurality of air supply means and selected openings among the plurality of openings in the lower side of the chamber means such that each of said plurality of air supply means is in direct communication with the interior of the chamber means via selected openings in the lower side thereof, said plurality of distributing means emitting air into the interior of the chamber means from said plurality of air supply means through said plurality of openings at pressures sufficient to substantially fluidize the particles located above said plurality of openings.

2. An incinerator for burning combustible materials, as described in claim 1, wherein the number of openings is greatest proximate the inlet end of the chamber means.

3. An incinerator for burning combustible materials, as described in claim 1, wherein the pressure of the air emitted through said openings is greatest proximate the inlet end of the chamber means.

4. An incinerator for burning combustible materials, as described in claim 2, wherein the pressure of the air emitted through said openings is greatest proximate the inlet end of the chamber means.

5. An incinerator for burning combustible materials, as described in claim 1, wherein the area on the lower side of the chamber means having openings therein is greatest proximate the inlet end of the chamber means.

6. An incinerator for burning combustible materials, as described in claim 2, wherein the area on the lower side of the chamber means having openings therein is greatest proximate the inlet end of the chamber means.

7. An incinerator for burning combustible materials, as described in claim 3, wherein the area on the lower side of the chamber means having openings therein is greatest proximate the inlet end of the chamber means.

8. An incinerator for burning combustible materials, as described in claim 4, wherein the area on the lower side of the chamber means having openings therein is greatest proximate the inlet end of the chamber means.

9. An incinerator for burning combustible materials, as described in claim 1, further comprising:
    means for inserting said particles into the interior of the chamber means.

10. An incinerator for burning combustible materials, as described in claim 1, further comprising:
    means for raising and lowering the screw conveyor means in relation to the lower side of the chamber means.

11. An incinerator for burning combustible materials, as described in claims 1, 2, 3, 4, 5, 6, 7, 8, 9, or 10, wherein the composition of the particles utilized assists in the control of undesirable emissions from the incinerator.

12. An incinerator for burning combustible materials, as described in claims 1, 2, 3, 4, 5, 6, 7, 8, 9, or 10, wherein said screw conveyor means is a rotatable auger, comprising:
    an axial member having two ends;
    a plurality of support members rigidly connected to said axial member; and
    a plurality of adjacent spiral flights disposed about said axial member in such manner that they form a continuous helix around said axial member, each of said flights having a leading edge and a trailing edge, the trailing edge of each of said flights slidably overlapping the leading edge of the adjacent one of said flights, each of said spiral flights being rigidly connected to a single support member and slidably connected to additional support members, said support members connecting and supporting said spiral flights in spaced concentric helical relationship to said axial member and defining an open annular space around said axial member.

13. An incinerator for burning combustible materials, as described in claim 11, wherein said screw conveyor means is a rotatable auger, comprising:

an axial member having two ends;

a plurality of support members rigidly connected to said axial member; and a plurality of adjacent spiral flights disposed about said axial member in such manner that they form a continuous helix around said axial member, each of said flights having a leading edge and a trailing edge, the trailing edge of each of said flights slidably overlapping the leading edge of the adjacent one of said flights, each of said spiral flights being rigidly connected to a single support member and slidably connected to additional support members, said support members connecting and supporting said spiral flights in spaced concentric helical relationship to said axial member and defining an open annular space around said axial member, flights in spaced concentric helical relationship to said axial member and defining an open annular space around said axial member.

14. An incinerator for burning combustible materials, comprising:

an elongated horizontally disposed stationary combustion chamber means, said chamber means having a first end with an inlet for receiving combustible materials into its interior and a second end with an outlet for discharging exhaust gases and combustion residue therefrom, the horizontal position of said elongated stationary combustion chamber means defining an upper and a lower side thereof, with a plurality of openings in the lower side thereof; and a screw conveyor means extending through said chamber means' interior from proximate said first end to proximate said second end for moving materials therethrough, said screw conveyor means being a rotatable auger including:

an axial member having two ends;

a plurality of support members rigidly connected to said axial member; and a plurality of adjacent spiral flights disposed about said axial member in such manner that they form a continuous helix around said axial member, each of said flights having a leading edge and a trailing edge, the trailing edge of each of said flights slidably overlapping the leading edge of the adjacent one of said flights, each of said spiral flights being rigidly connected to a single support member and slidably connected to additional support members, said support members connecting and supporting said spiral flights in spaced concentric helical relationship to said axial member and defining an open annular space around said axial member.

15. An incinerator for burning combustible materials, as described in claims 1, 2, 3, 4, 5, 6, 7, 8, 9, or 10, further comprising a generally vertically disposed hollow treatment segment, said hollow treatment segment having a lower input end whereby its interior is in communication with the interior of the chamber means and receives exhaust gases therefrom, and a treatment portion above said input end with exhaust treatment particles located therein such that the exhaust treatment particles utilized assist in the control of undesirable emissions from the incinerator.

16. An incinerator for burning combustible materials, as described in claim 15, wherein said hollow treatment segment is flared.

17. An incinerator for burning combustible materials, as described in claim 11, further comprising a generally vertically disposed hollow treatment segment, said hollow treatment segment having a lower input end whereby its interior is in communication with the interior of the chamber means and receives exhaust gases therefrom, and a treatment portion above said input end with exhaust treatment particles located therein such that the exhaust treatment particles utilized assist in the control of undesirable emissions from the incinerator.

18. An incinerator for burning combustible materials, as described in claim 17, wherein said hollow treatment segment is flared.

19. An incinerator for burning combustible materials, as described in claim 12, further comprising a generally vertically disposed hollow treatment segment, said hollow treatment segment having a lower input end whereby its interior is in communication with the interior of the chamber means and receives exhaust gases therefrom, and a treatment portion above said input end with exhaust treatment particles located therein such that the exhaust treatment particles utilized assist in the control of undesirable emissions from the incinerator.

20. An incinerator for burning combustible materials, as described in claim 19, wherein said hollow treatment segment is flared.

21. An incinerator for burning combustible materials, as described in claim 13, further comprising a generally vertically disposed hollow treatment segment, said hollow treatment segment having a lower input end whereby its interior is in communication with the interior of the chamber means and receives exhaust gases therefrom, and a treatment portion above said input end with exhaust treatment particles located therein such that the exhaust treatment particles utilized assist in the control of undesirable emissions from the incinerator.

22. An incinerator for burning combustible materials, as described in claim 21, wherein said hollow treatment segment is flared.

23. An incinerator for burning combustible materials, as described in claims 1, further comprising means for injection of underfire fuel into the combustion chamber through the lower side of the combustion chamber.

24. An incinerator for burning combustible materials, as described in claims 1, wherein the volume of the combustion chamber is greater at its second end than at its first end.

* * * * *